Figure 1:
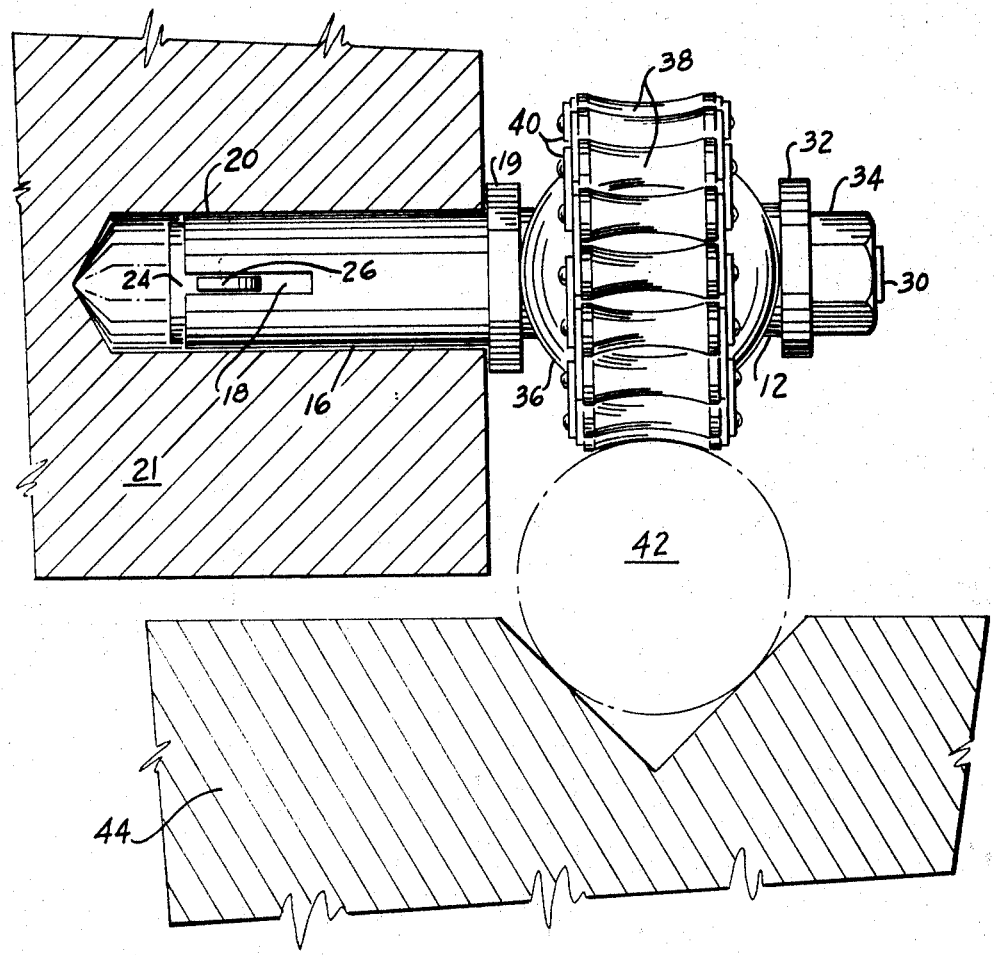

April 15, 1969      J. B. THOMSON      3,438,683
TRUNNION FOR LINEAR ANTIFRICTION BEARINGS
Filed Feb. 19, 1965      Sheet _1_ of 2

INVENTOR.
JOHN B. THOMSON
BY
MORGAN, FINNEGAN, DURHAM & PINE
ATTORNEYS

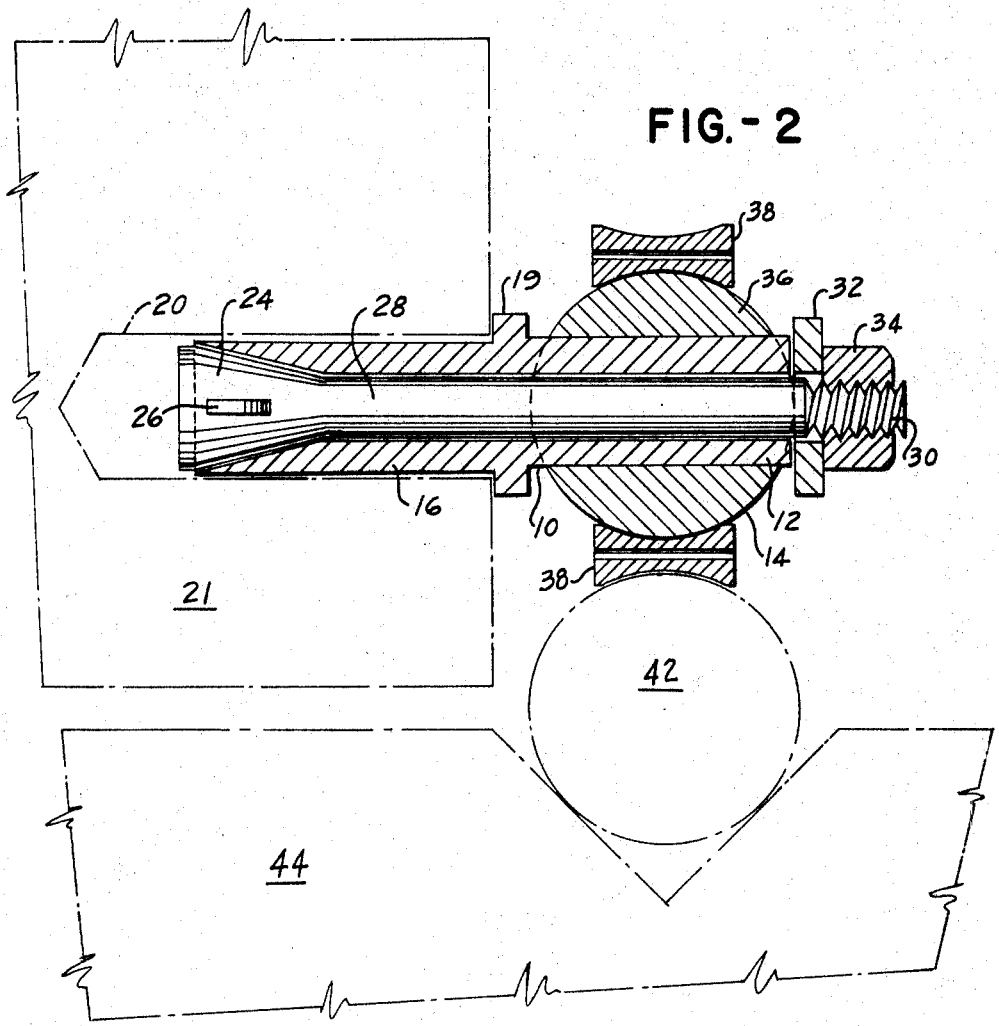

United States Patent Office 3,438,683
Patented Apr. 15, 1969

3,438,683
TRUNNION FOR LINEAR ANTIFRICTION
BEARINGS
John B. Thomson, 1029 Plandome Road,
Manhasset, N.Y. 11030
Filed Feb. 19, 1965, Ser. No. 434,054
Int. Cl. F16c 17/00, 21/00, 19/00
U.S. Cl. 308—6                                    2 Claims The present invention relates to a novel and improved self-locking, adjustable cantilever trunnion for supporting a linear motion antifriction bearing assembly on a linearly moving part as the bearing moves on a shaft or way.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

FIGURE 1 is a side elevation of an illustrative and preferred form of the present invention; and FIGURE 2 is a longitudinal sectional view of the trunnion shown in FIGURE 1.

The present invention has for its object the provision of a novel and improved self-locking, adjustable cantilever trunnion which may be mounted in a blind bore in a machine part which is to be moved linearly and serves as the support for a linear motion antifriction bearing which runs on a shaft or way. In the mounting of such bearings on heavy machine parts, it is frequently inconvenient to mount such bearings on trunnions which require the use of set screws to hold the trunnion in place, and it is more frequently inconvenient to use the more conventional bearing blocks which are relatively bulky and require additional space on the machine part for their mounting. It will be understood, of course, that the bearing may be mounted in a stationary member to support a shaft or way that moves in a linear direction.

According to the present invention, there is provided a self-locking cantilever trunnion for a linear motion antifriction bearing, such as is shown in my prior application, Ser. No. 204,971, filed June 25, 1962, the trunnion being adjustable by rotational movement, and supporting an oblong roller type bearing assembly. Obviously, it can be used with other types of antifriction bearings which support linear motion. The trunnion is hollow and has a cylindrical inner end portion and an outer cylindrical bearing portion, the two cylindrical portions being eccentric with respect to each other, but on parallel axes. The inner end portion of the trunnion is longitudinally split so that it may expand, has its interior tapered and is provided with a conical member by which the split portion may be expanded so as to fill and tightly grip the hole into which the trunnion is inserted. The outer cylindrical bearing portion receives the roller bearing assembly so that the bearing assembly is pivotally mounted thereon. Between the cylindrical bearing portion and the inner end portion there is provided a shoulder which serves as a thrust bearing against which the bearing assembly may work. The shoulder is also formed so that it may be engaged by a wrench for rotational adjustment of the trunnion, thereby varying the position of the rollers of the bearing assembly with respect to the way on which they ride. Conveniently, the shoulder is formed with a hexagonal exterior so that it may be engaged and turned by an open-ended wrench. The conical member is connected to a threaded member by which the conical member may be drawn into the tapered portion of the trunnion, and for this purpose the cone is preferably provided with an elongated stem which extends to the outer end of the hollow trunnion where it is threaded into a nut, a thrust washer being provided between the nut and the bearing surface so that the bearing assembly is confined between the two thrust surfaces. On tightening the nut, the conical member is drawn to expand the split end of the trunnion, thereby securely locking the trunnion in its mounting hole.

It will be understood that the foregoing general description and the following detailed description as well are exemplary and explanatory of the invention but are not restrictive thereof.

Thus, while the trunnion of this invention is particularly adapted to and was designed for mounting in a blind bore, the principles underlying the operation of the invention are not limited to such usage, and the trunnion can equally suitably be mounted in a through hole. Likewise, while the trunnion may serve as the support for any desired machine part or assembly, whether moving or stationary, in order to provide an example of a practical and useful embodiment of the invention the trunnion is herein described as supporting a linear motion antifriction bearing assembly on a linearly moving machine part as the bearing moves on a shaft or way.

Referring now in detail to the present and preferred illustrative embodiment of the invention, as shown by the accompanying drawings, the self-locking adjustable cantilever trunnion comprises an elongated, generally cylindrical, hollow member 10 having an outer cylindrical bearing portion 12 adapted to receive and support a recirculating linear motion roller bearing assembly 14 and an inner cylindrical portion 16, the inner end of which is longitudinally slotted, as at 18, the slotted portion also being interiorly tapered in the general form of a cone. The inner portion 16 and the outer portion 12 are eccentric with respect to each other, although their axes are parallel.

Between the inner and outer portions 12 and 16, there is provided an integral shoulder 19 which serves to locate the trunnion as it is inserted in to the blind hole 20 in the machine part 21 to be supported, and also serving as a thrust bearing surface for the bearing assembly 14. The shoulder 19 is preferably formed with a hexagonal exterior surface so that it may be rotated by a wrench to adjust the rotational position of the trunnion and thereby vary the relation of the surface of the bearing assembly with respect to the machine part to be slidably supported.

For expanding the trunnion and holding it securely within the hole 20 and for preventing its rotation within the hole once it has been adjusted and secured, there is provided a conical member 24 within the tapered inner end of the trunnion, the conical member being formed with a key 26 which fits into a slot 18 and prevents rotation of the conical member 24 as it is moved to expand the slotted end of the trunnion.

Extending outwardly of the conical member is a stem 28 which ends in a threaded portion 30 projecting from the outer end of the trunnion 10 and which may be provided with a washer 32 and nut 34, by which the cone is drawn into tight, expanding engagement with the slotted portion of the inner end of the trunnion. The washer 32 held against movement by the outer end of the trunnion serves as a thrust surface for the other side of the bearing assembly.

The bearing assembly 14 comprises a cylindrical race member 36 having curved ends forming the inner bearing surface of a recirculating series of concave rollers 38 which are preferably held together by means of chain links 40, the lower course of the rollers bearing against a shaft or round way 42, which is firmly secured to the bed of the machine 44 on which the supported part is to be linearly moved.

The desired vertical adjustment of the supported part of the machine with respect to the machine bed is obtained by loosening the nut 34, after which the trunnion may be rotated by wrenching on the hexagonally-formed shoulder 19. When the desired adjustment has been attained, the nut 34 is again tightened, thereby locking the trunnion in its desired position of adjustment and simultaneously securing the trunnion against axial movement, thereby providing a firm trunnion support for the bearing assembly.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A self-locking, adjustable cantilever trunnion for a linear motion bearing comprising an outer cylindrical bearing portion to receive and support the bearing assembly, an inner cylindrical portion eccentric with respect to said outer bearing portion, said inner portion being longitudinally split near the inner end thereof with said formed split portion having an interior tapered surface, a shoulder portion between said outer bearing portion and said inner cylindrical portion, said shoulder portion including means to receive a tool for rotation of said trunnion to adjust the rotational position of said outer bearing portion, an expansion cone within said split portion of said trunnion, stem means connected at one end to said expansion cone and extending axially through said inner cylindrical portion and said outer bearing portion, said stem means including means to draw said expansion cone into and thereby expand said split portion and means disposed between said cone and said split portion for preventing relative rotation between said expansion cone and said split portion of said trunnion to permit said split portion to be expanded without changing the position of said bearing portion of said trunnion.

2. A self-locking, adjustable cantilever trunnion as called for in claim 1, wherein said means preventing the relative rotation between said expansion cone and said split portion comprises a key member fixed to said expansion cone and slidably received in said split portion of said trunnion.

References Cited

UNITED STATES PATENTS

| | | | |
|---|---|---|---|
| 3,195,420 | 7/1965 | Johonnsen | 308—62 X |
| 3,271,826 | 9/1966 | Jackson | 308—15 X |
| 726,070 | 4/1903 | Keen | 287—124 X |
| 1,242,744 | 10/1917 | Trautman | 308—62 |
| 1,535,568 | 4/1925 | Bornschein | 308—62 |
| 2,230,442 | 2/1941 | Arms | 308—6 |
| 2,535,501 | 12/1950 | Loughridge | 308—62 X |
| 2,803,881 | 8/1957 | Baker | 287—124 X |
| 2,953,417 | 9/1960 | Horberg | 308—236 X |
| 3,190,703 | 6/1965 | Thomson | 308—6 |

MARTIN P. SCHWADRON, *Primary Examiner.*

LUCIOUS L. JOHNSON, *Assistant Examiner.*

U.S. Cl. X.R.

308—22, 24; 287—124